No. 654,971. Patented July 31, 1900.
L. A. & B. A. GREYER.
FOLDING CARRIAGE.
(Application filed Jan. 10, 1900.)
(No Model.) 2 Sheets—Sheet 1.

WITNESSES.
C. H. Gannett
Arthur Wark

INVENTORS.
Louis A. Greyer,
Bertha A. Greyer,
By E. D. Chadwick,
Attorney.

No. 654,971.  L. A. & B. A. GREYER.  Patented July 31, 1900.
FOLDING CARRIAGE.
(Application filed Jan. 10, 1900.)
(No Model.) 2 Sheets—Sheet 2.
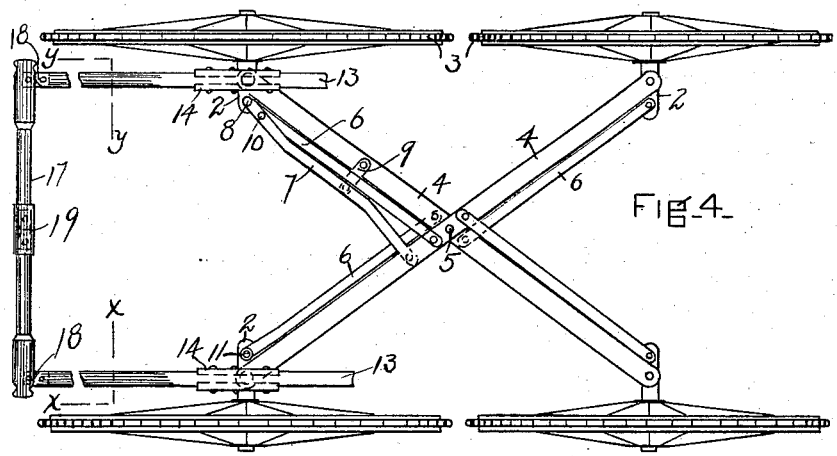
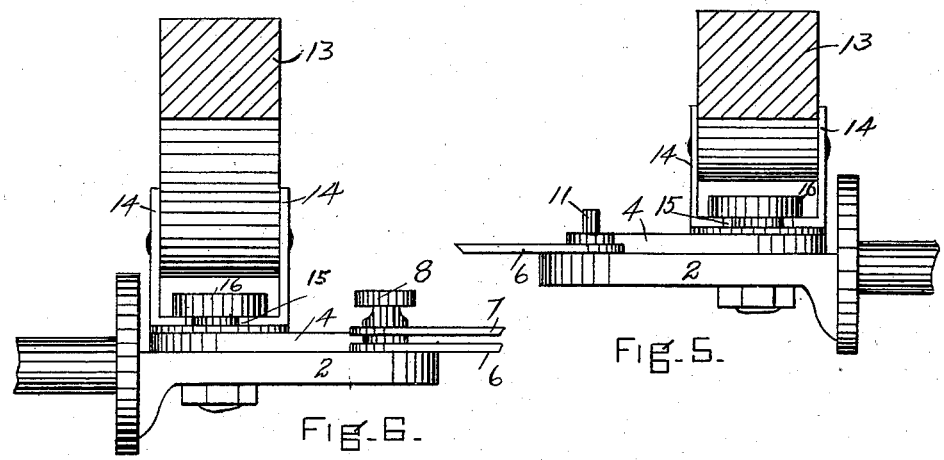
WITNESSES.
C. H. Garnett.
Arthur Wark.
INVENTORS.
Louis A. Greyer,
Bertha A. Greyer,
By E. J. Chadwick,
Attorney.

UNITED STATES PATENT OFFICE.

LOUIS A. GREYER AND BERTHA A. GREYER, OF BOSTON, MASSACHUSETTS.

FOLDING CARRIAGE.

SPECIFICATION forming part of Letters Patent No. 654,971, dated July 31, 1900.

Application filed January 10, 1900. Serial No. 1,015. (No model.)

*To all whom it may concern:*

Be it known that we, LOUIS A. GREYER and BERTHA A. GREYER, citizens of the United States, residing at Boston, in the county of Suffolk and State of Massachusetts, have invented certain new and useful Improvements in Folding Carriages, of which the following is a specification.

Our invention relates to baby-carriages, and is intended to provide a practical and durable carriage which may be easily folded and extended laterally and may be wheeled when folded as readily as when extended.

A folding carriage embodying our invention is shown in the accompanying drawings, in which—

Figure 1:
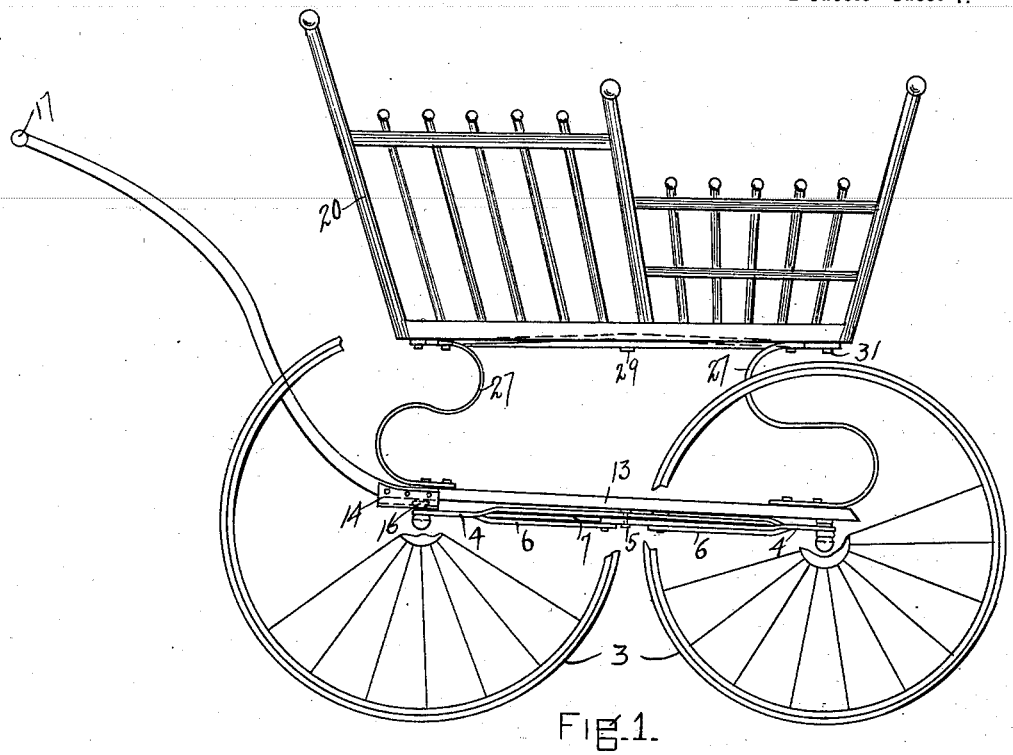
Figure 2:
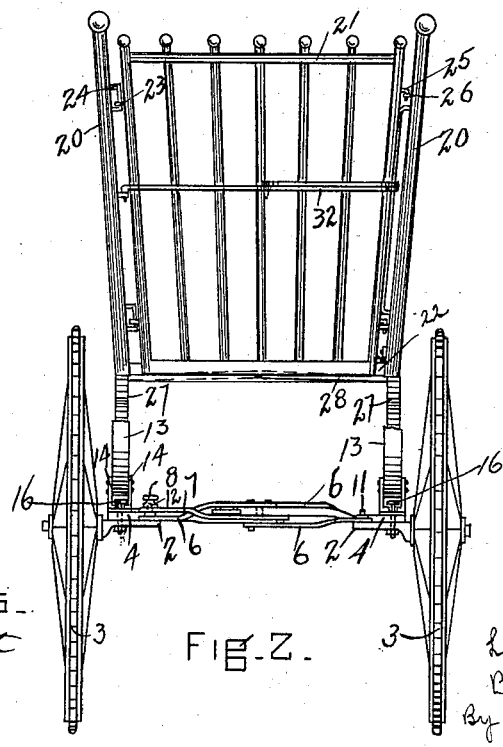

Figure 1 is a side elevation of the carriage with a portion of the wheels broken away. Fig. 2 is a rear elevation of the carriage as it appears when extended, the handle-bar being omitted. Fig. 3 is a fragmentary plan view showing the body portion extended, but with the bottom and ends folded. Fig. 4 is a plan view of the running-gear extended. Figs. 5 and 6 are enlarged sections taken, respectively, on the lines $x\ x$ and $y\ y$ in Fig. 4.

The running-gear of our carriage comprises four short axles 2, each carrying a wheel 3, said axles being connected to one another by two bars 4, extending between the diagonally-opposite axles and pivoted together at their point of intersection by a bolt or pivot 5, thereby providing for the folding and extending of said parts in an obvious manner. In order that the carriage may be wheeled when folded as well as when extended, we provide each axle with a link 6, pivoted at one end to said axle and at the opposite end to the opposite bar 4, as shown, the pivotal points being so adjusted that all the axles 2, and therefore all the wheels 3, will be parallel with each other in both of the extreme positions above referred to. The links pivoted to opposite axles should be pivoted to the non-adjacent or outer faces of the crossed bars 4, as best shown in Fig. 4, so that said bars may be folded without being intercepted by said links. These parts should also be offset, as shown in Fig. 2, sufficiently to provide for the accommodation of the bars between the links as the parts approach the folded position.

The parts above described are provided with means whereby they and with them the remaining parts of the carriage may be locked in their folded and extended positions, said means preferably consisting of a bar 7, pivoted at one end to one of the bars 4 and provided at its other end with a knob or handle 8. The movements of the bar 7 when the carriage is folded or extended are controlled by a link 9, pivotally connected to said bar and to the adjacent bar 4, as shown in Fig. 4, these parts and pivots being so located and proportioned that when the carriage is folded a hole 10, formed in the bar 7, will be in position to receive a pin 11, projecting upward from one of the axles 2, and when the carriage is extended a similar hole (shown as formed in the bottom of the knob 8) will be in position to receive a pin 12 on the opposite axle 2, thereby locking the carriage in either position. The pins 11 and 12 may conveniently consist of an extension of the pivots by which the respective axles 2 and links 6 are secured together, and the bar 7 is made sufficiently flexible to permit its free end to be sprung upward far enough to provide for the engaging and disengaging of said pins with their respective holes.

Upon the running-gear above described are supported two side-bars 13, each secured to one of the axles 2 and provided with means whereby a longitudinal movement is permitted between said side-bar and the other axle on the same side during the folding and extending of the carriage. To this end each side-bar 13 is provided, preferably, over the corresponding rear axle with two metallic strips 14, secured thereto, each strip having its lower edge turned inward a short distance below the bottom of said side-bar. A guiding-slot 15 is thereby provided, within which slides a headed stud 16, secured to the axle 2 and preferably consisting of an extension of the pivot connecting said axle with its bar 4, thereby preventing the separation of the axle and side-bar, but permitting the movement thereof longitudinally with respect to each other. The side-bars 13 are extended rearwardly and bent upward back of the body of the carriage, according to the usual construction, and are connected at their upper ends by a handle-bar 17, which is adapted to be folded with the carriage, as by making it in two parts hinged together at its center, each part being also hinged to one of the side-bars 13, as shown at 18 in Fig. 4. A sleeve 19 is arranged to slide on the handle-bar 17 and to cover the central hinge and the adjacent portions of said handle-bar when the carriage is extended, thereby preventing the folding of the handle-bar in an obvious manner.

The body portion of our carriage comprises two sides 20, two ends 21, and a bottom 22, these parts being secured together and adapted to be folded in any suitable manner, but preferably by hinging the ends to one of the sides and the bottom to the other, as shown. The hinges on which the ends 21 are hung consist, respectively, of an eye 23, secured to one of the hinged parts and arranged to slide vertically on an elongated staple 24, secured to the other of said hinged parts, so that said ends may be slightly lifted, thereby disengaging the hooks 25, with which their free edges are provided, from the eyes 26, with which they normally engage when the carriage is extended, and permitting said parts to be folded by swinging the ends inward against the side 20, to which they are hinged. The sides 20 are supported on springs 27, secured at their lower ends to the side-bars 13 and are connected to each other in such manner as to permit of their being folded and extended with the rest of the carriage, preferably by means of two crossed bars 28, extending diagonally between the sides 20 and pivoted to each other at their point of intersection 29. Each bar 28 is also pivoted at one end to one of the sides 20 and is provided at its other end with a slot 30, through which passes a headed pin 31, secured to the corresponding side 20, thereby providing a sliding connection between said side and bar and providing for the necessary relative movements of said parts. The bottom 22 normally rests on the bars 28 and is supported thereby.

In Fig. 2 we have shown a double locking-brace 32, which may be used to give rigidity to the sides of the carriage when it is either folded or extended and which need not be further described herein, as it is described and claimed in Letters Patent No. 618,022, for a folding carriage, granted to us January 17, 1899.

To fold the carriage, the cushions and seat (not shown) are removed, the bottom 22 is lifted up against the side 20, to which it is hinged, the ends 21 are lifted slightly, thus releasing the hooks 25 from the eyes 26, and are then swung inward, the sleeve 19 is slid along the handle-bar 17 until the hinge at the center thereof is uncovered, the brace 32 is unhooked, and the bar 7 is disengaged from the pin 12, whereupon the two sides of the carriage may be pressed together and locked by means of the bar 7 and pin 11 and the brace 32, in which folded position the wheels of the carriage will still remain parallel with one another, so that the carriage may be wheeled when folded as easily as when extended. The operation of extending the carriage will be obvious without further description.

We claim as our invention—

1. In a folding carriage, the combination with a folding body portion of two crossed bars pivoted together, an axle pivoted to each end of each of said bars and extending inward therefrom, and means connected with the inner ends of said axles for automatically preserving the parallellism thereof in both the folded and extended positions of the carriage.

2. In a folding carriage, the combination with a folding body portion of two side-bars each provided with a guide 15, two crossed bars each pivoted at one end to one of said side-bars and guided at its opposite end in one of said guides 15, said bars being also pivoted to each other at their point of intersection, axles 2 each provided with a wheel and pivoted to said crossed bars, and means connected with the inner ends of said axles for automatically keeping the same parallel with one another in both the folded and extended positions of the carriage.

3. In a folding carriage, the combination of two crossed bars 4 pivoted together at their point of intersection, axles 2 pivoted respectively to the ends of said bars 4 and carrying wheels 3, links 6 each pivoted to an axle 2 and to the opposite bar 4, as described and for the purpose set forth, and a folding body portion supported by said axles.

4. In a folding carriage, the combination with a folding body portion of two crossed bars pivoted together at their point of intersection, axles 2 each provided with a wheel and pivoted respectively to the ends of said bars, means for automatically preserving the parallelism of said axles in both the folded and extended positions of the carriage, and a locking device comprising a bar 7 and a link 9 pivoted to each other and to said crossed bars respectively, as described, and pins 11 and 12 each secured to one of said axles and adapted to engage holes formed in said bar 7, for the purpose set forth.

5. In a folding carriage, the combination with a folding running-gear of two side-bars supported thereon, springs carried on said side-bars, and a folding body portion supported by said springs and comprising sides 20, ends 21 and a bottom 22, said ends being hinged to one of said sides and the bottom 22 to the other, and two crossed bars 28 pivoted together at their point of intersection and each pivoted at one end to one of the sides 20 and provided at its other end with a slot 30 containing a headed pin 31, substantially as described.

6. A folding carriage comprising in combination two crossed bars 4 pivoted together, axles 2 secured thereto and each carrying a wheel, links 6 each pivoted to an axle 2 and to one of said bars 4, side-bars 13 supported on said axles and each provided with a slotted guide 15 adapted to engage a headed stud 16 secured to one of the axles 2, a folding handle-bar, springs 27 carried by the side-bars 13, sides 20 supported on said springs, ends 21 hinged to one of said sides, a bottom 22 hinged to the other of said sides, and two crossed bars 28 pivoted together and to said sides respectively, a slot 30 in each bar 28, and a headed pin 31 passing through each slot 30 and secured to the corresponding side 20, as described.

In testimony whereof we have hereunto subscribed our names this 4th day of January, 1900.

LOUIS A. GREYER.
BERTHA A. GREYER.

Witnesses:
MARY G. LUNDREGEN,
ROB LEHMAN.